United States Patent [19]

Gitlin et al.

[11] 4,072,830

[45] Feb. 7, 1978

[54] VARIABLE PHASE SHIFTER FOR ADAPTIVE ECHO CANCELLERS

[75] Inventors: Richard Dennis Gitlin, Monmouth Beach; John Stewart Thompson, Tinton Falls, both of N.J.

[73] Assignee: Bell Telephone Laboratories, Incorporated, Murray Hill, N.J.

[21] Appl. No.: 729,004

[22] Filed: Oct. 4, 1976

[51] Int. Cl.² .......................................... H04B 3/24
[52] U.S. Cl. ................................................ 179/170.2
[58] Field of Search ................ 179/170.2, 170.6, 170.8

[56] References Cited

U.S. PATENT DOCUMENTS

| | | | |
|---|---|---|---|
| 3,597,541 | 8/1971 | Proakis et al. | 179/170.2 |
| 3,721,777 | 3/1973 | Thomas | 179/170.2 |

OTHER PUBLICATIONS

Demytko and Mackechnie, "A High Speed Digital Adaptive Echo Canceller," A.T.R. Australian Telecommunications Research, vol. 7, No. 1, 1973, pp. 20–28.

Primary Examiner—Kathleen H. Claffy
Assistant Examiner—Randall P. Myers
Attorney, Agent, or Firm—John Francis Moran

[57] ABSTRACT

The echo path of an echo signal subjected to a time-varying phase shift is bridged by echo cancelling apparatus including a variable phase shifter and an adaptive echo canceller connected in series. The variable phase shifter includes an adaptive control loop whose operation is compatible with that of an adaptive echo canceller. The phase-shifter control loop derives a control signal from the output signal synthesized by the echo cancelling apparatus and the residual echo produced by subtracting this output signal from the echo path signal. The control signal is used to produce a variable phase shift on the signal passing through the variable phase shifter in the echo cancelling apparatus. The echo canceller adaptively synthesizes a replica of the echo signal produced by the linear dispersive portion of the echo channel, while the variable phase shifter is adapted to impart a time-varying phase shift corresponding to the time-varying phase shift encountered by the echo signal in the echo path. The echo cancelling apparatus is therefore able to produce an output signal which closely approximates the echo signal including the time-varying phase shift for more effective echo cancellation.

9 Claims, 3 Drawing Figures

VARIABLE PHASE SHIFTER FOR ADAPTIVE ECHO CANCELLERS

BACKGROUND OF THE INVENTION

This invention relates to the elimination of echos in communication signal paths and, more particularly, to effective cancellation of echos in communication paths which subject the echo signal to time-varying transmission impairments.

In communication paths via carrier systems, a signal returned because of an impedance mismatch at a hybrid junction is subjectively termed an echo due to its delayed arrival at the signal source. The returned signal may experience time-varying transmission impairments such as frequency offset and phase jitter. Frequency offset in an echo path can be produced in certain types of frequency division multiplexed transmission systems wherein a common carrier supply is not used for both transmitter and receiver terminals at one end of a transmission system and that system is located between the echo control device and the hybrid junction. Phase jitter refers to spurious variations in phase between successive portions of a repetitive signal in relation to the phase of a continuous oscillation at a fixed frequency and may also result from a variety of effects in different carrier systems which make up a portion of the echo path. The typical carrier system includes two one-way signal paths wherein phase differences may also arise between the carrier signals of the two paths because of time-varying signal propagation delays. Accordingly, a versatile echo canceller must compensate for time-varying phase impairments in the channel to provide adequate echo cancellation.

One approach to this problem is to increase the speed of the adaptive process performed by the echo canceller to accommodate time variations in the impulse response of the echo path in addition to the always-present, somewhat time invariant, characteristics of the impulse response. This may be done by increasing the incremental size, or gain, of the adaptation process; however, this approach is inconsistent with minimization of residual echo since speed of operation necessary to accommodate time variations is traded for precise operation. Precise operation is essential to refine the adaptation process to provide an accurate replica of the echo signal and minimize residual echo. Rapid convergence also tends to decrease the stability of echo cancellers and increases undesirable adaptation such as to noise and double-talking, i.e., intervals in which signals are transmitted by both one-way signal paths at the same time.

SUMMARY OF THE INVENTION

It is a primary object to compensate for time-varying phase shift in a manner compatible with the operation of the gradient algorithm utilized adaptively to synthesize a replica of an echo signal.

A related object is to advantageously combine the inherent features of adaptive echo cancelling and phase-shifting techinques to provide a highly flexible and stable adaptive echo canceller.

The invention in its various aspects overcomes the limitations of prior-art echo cancellers. Broadly, the invention includes an adaptive phase shifter and an adaptive echo canceller which automatically operate to model selective portions of an echo path transfer function. When the model is adapted, a time-varying phase component is produced on a composite replica of the echo signal. This arrangement produces efficient echo cancellation by automatic adjustment to the time-varying phase component of the echo signal, while simultaneous adaptation is provided to synthesize the more-or-less time invariant portion of the echo signal of same without compromising either process.

In its broader aspects, the invention takes the form of a shunt signal path of apparatus comprising a variable phase shifter and an adaptive echo canceller connected in series across an echo path producing an echo signal which includes a time-varying phase shift. The shunt signal path produces an output signal formed by the serial signal processing of the phase shifter and the echo canceller. This output signal is subtracted from the echo signal to produce a residual echo. A controller responds to the residual echo and the resultant output signal to adapt the phase shifter to introduce a time-varying phase shift in the output signal of the shunt signal path. This phase shift is adapted to correspond to the time-varying phase shift of the echo signal to minimize the residual echo.

In some of the more specific aspects of the invention, the phase shifter divides its input signal into quadrature phase components and multiplies each component by a factor selected by a controller. The products from the signal components are combined to produce a phase-shifted output signal. The controller transforms the output signal by a quadrature phase shift and multiplies it by the residual echo to product a signal indicative of the time-varying phase shift on the echo signal. This latter signal is processed by two serially connected accumulators. The values of sine and cosine trigonometric functions are used to determine the selected factors in the phase shifter. A signal level detector is also included to render the phase shifter inoperative when an original signal emanates from the echo path.

BRIEF DESCRIPTION OF THE DRAWING

Features of the invention and additional objects of same will be more fully appreciated from the following detailed description when considered in conjunction with the accompanying drawing in which.

DETAILED DESCRIPTION

Figure 1:
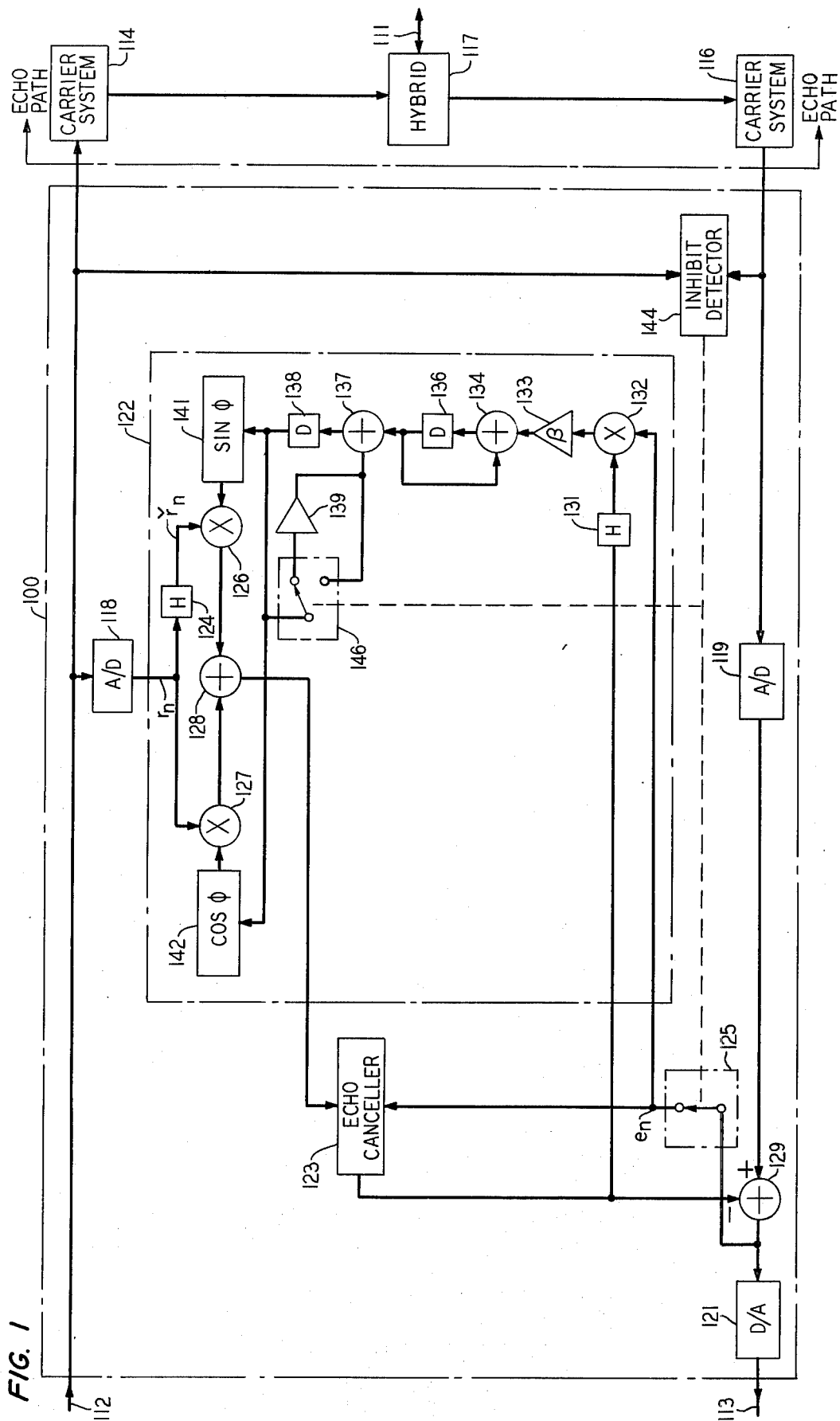
FIG. 1 is a diagram of echo cancellation apparatus constructed in accordance with the present invention.

In FIG. 1, if one for the time being ignores the apparatus enclosed by dashed-line box 100, a single transmission terminal is basically illustrated for inter-connecting a single two-way circuit 111 with two one-way circuits 112 and 113 by way of respective carrier systems 114 and 116 and hybrid network 117. Carrier systems 114 and 116 may be employed in any one of a number of different forms. Hybrid network 117 may generally include a balancing network (not shown) for impedance matching purposes. In telephone parlance, two-way circuit 111 is referred to as a two-wire circuit and one-way circuits 112 and 113 form a so-called four-wire circuit. The former is usually used for local circuits, for example, telephone subscriber loops, while the latter is typically used in toll circuits for distant transmission and may take the form of a carrier transmission system.

Ideally, all signals originating on circuit 112 are only passed on to circuit 111 and incoming signals from the latter are passed on to one-way return circuit 113 by hybrid 117. However, since impedance mismatches cannot be prevented in the actual transmission circuits connected to hybrid 117, a portion of the signal energy in circuit 112 appears on circuit 116 and, in the absence of some form of echo suppression or cancellation, is returned on circuit 113. Due to the transmission delays encountered as the signals propagate over circuits 112, 114, 117, 116 and 113 in FIG. 1, the return signal is perceived as an echo. The complete echo signal path with respect to apparatus 100 includes carrier systems 114 and 116 and the leakage signal path that traverses hybrid 117. Often synchronous type systems are employed for carrier systems 114 and 116. Synchronous systems utilize modulation techniques well known for efficiency of information transmission, e.g., single sideband modulation with suppressed carrier. Accordingly, echo cancelling apparatus 100, which will be discussed hereinafter, is employed to eliminate the echo signal without any interruption in the signal path between circuits 116 and 113. In most system applications, apparatus 100 is likely to be geographically removed from hybrid 117. Furthermore, another echo canceller is typically used at the other end of transmission circuits 112 and 113 (not shown in FIG. 1) to provide echo cancellation for signals originating on circuit 113 which are unavoidably partially returned on circuit 112 as an echo. The echo cancelling apparatus of FIG. 1 is shown in digital form. Accordingly, analog-to-digital converters 118 and 119 and digital-to-analog converter 121 are utilized to perform the appropriate signal conversions between the analog and digital apparatus of FIG. 1. At this point, it is again stressed that the transmission apparatus in FIG. 1 may take on a number of different forms. For instance, if the signals on circuits 112 and 113 are digital signals, the type of converters shown in FIG. 1 may not be required. In this case, conversions between digital-to-analog and vice versa would become an integral part of circuits 112 and 116 and terminate the two one-way signal paths to provide an analog signal interface for carrier systems 114 and 116 and hybrid 117. The echo cancelling apparatus may even be designed to work directly from these digital signals. However, it should be pointed out that the echo cancelling apparatus may also be readily implemented using analog circuitry if desired by those skilled in the art. In this latter situation, no signal conversions would be necessary if the actual transmission signals at the junctions of all circuits, including carrier systems 114 and 116, are analog.

The echo cancelling apparatus enclosed by box 100 in FIG. 1 provides a shunt signal path to produce an output signal which is a copy of the echo signal emanating from system 116. The shunt signal path includes serially connected variable phase shifter 122 and adaptive echo canceller 123. Since linear signal processing is provided by shifter 122 and canceller 123, their order of employment in the shunt signal path may readily be reversed from that shown in FIG. 1 if desired by those skilled in the art. Echo canceller 123 is shown generally since it may be any one of a number of different echo cancellers well known in the art. For example, conventional echo cancellers may be used which typically include an adaptive control loop to modify the replica synthesized by the signal processing circuitry therein. Again, although a digital implementation of echo cancelling circuitry is indicated by FIG. 1, analog circuitry may be employed, particularly if one desires to utilize an analog implementation of phase shifter 122.

The portion of phase shifter 122 in the shunt signal path includes Hilbert transformer 124, multipliers 126 and 127, and signal combiner 128. The remaining portions of the circuitry in phase shifter 122 form the control path of an adaptive control loop. The inputs to the control loop are the replica of the echo signal produced by canceller 123 and the residual echo signal or error signal provided by the output of signal combiner 129.

Phase shifter 122 imparts a variable phase component to the input signal of echo canceller 123. Therefore echo canceller 123 is able to produce a replica including a time-varying component corresponding to that introduced by carrier systems 114 and 116 individually or in combination. The replica, in this case, is also the composite output signal of the shunt signal path which includes the serial signal processing of phase shifter 122 and canceller 123. Most typically, the time-varying component is in the form of a frequency offset which appears as a continuous phase shift or roll on the echo signal traversing hybrid 117. In terms of the impulse response of the echo signal path, frequency offset produces a time variation in the impulse response corresponding to a phase roll.

A brief mathematical presentation will be given to provide a thorough explanation of this invention. In the case of a constant phase shift by $\hat{\phi}$ radians of the input signal, $r(t)$, the phase-shifter output, may be expressed as $$s(t) = r(t)\cos\hat{\phi} + \tilde{r}(t)\sin\hat{\phi}, \qquad (1)$$

where $s(t)$ is the signal appearing at the output of the summer 128, and where $\tilde{r}(t)$ results from a filtering operation on $r(t)$ known as the Hilbert transform. The Hilbert transform is defined in Signals and Noise in Communication Systems by H. E. Rowe, copyright 1965, by D. Van Nostrand Company, Inc., section 1.5, pages 13–20. In a frequency domain representation of $\tilde{r}(t)$ results from a quadrature phase shift, i.e., 90° phase shift on every spectral component of $r(t)$. Thus, an implementation of the Hilbert transform is provided by an all phase filter whose output signal is shifted 90° from its input signal, or by two delay-equalized filters whose outputs differ by 90° in phase.

The echo path in the illustrative application of this invention includes a phase shift, or time-varying parameter, $\phi$. When phase shifter 122 provides an estimated phase shift of $\hat{\phi}$ equal to $\phi$, and the echo canceller 123 is adapted, the shunt signal path will produce an output signal which can completely cancel the echo signal. For automatic adaptation of $\hat{\phi}$ compatible with the automatic operation of an adaptive echo canceller, an adaptive gradient algorithm will provide concurrent adaptation of the variable phase shifter and the adaptive echo canceller. This enables the echo canceller to synthesize a replica of the hybrid pulse response, while at the same time synthesizing the time-varying phase component model of the phase shift introduced by the carrier systems. Thus the cascade of the phase shifter and the echo canceller model the entire echo path transfer function.

The iterative equation for the parameters in an adaptive gradient algorithm has the general form $$b_{n+1} = b_n - kg(f(e)) \qquad (2)$$

where $b$ is the parameter being changed discretely in time, $n$ is the sample number, $k$ is a "gain" constant and $g$ is the gradient function of $f(\cdot)$ which is the function to be minimized in the adaptive process. In general, $b$ would consist of the adjustable parameters of the canceller and phase shifter. In the more specific situation of this invention, we focus on the phase shifter (the canceller structure plus control algorithm is well known to those skilled in the art), thus $\phi$ is the parameter equivalent to $b$ and $e^2$ is the square echo function to be minimized. Computation of the expression for the mean, or averaged, squared canceller output error, for the purpose of controlling the adaptive loops including the adaptive echo canceller, produces $$E = <e_n^2> = <[\epsilon_n\cos\phi + \check{\epsilon}_n\sin\phi - (c' r_n\cos\hat{\phi} + c' \check{r}_n\sin\hat{\phi})]^2> \quad (3)$$

With respect to equation (3):

$$c = \begin{bmatrix} c_o \\ c_1 \\ \vdots \\ c_{N-1} \end{bmatrix}$$

is the vector of canceller tap weights in 123, that is, $c_i$ is the multiplier coefficient of tap $i$ in the delay line of the echo canceller 123, N is the number of taps in the echo canceller 123 and $$r_n = \begin{bmatrix} r_n \\ r_{n-1} \\ r_{n-2} \\ \vdots \\ r_{n-N-1} \end{bmatrix}$$

is the vector of $r(t)$ in the delay line of the canceller. The vector transpose of $c$ is indicated by $c'$; $\epsilon_n$ is the output of the hybrid in the absence of any phase shift; the index n indicates the sample number and $<\ >$ indicates the process of statistical averaging.

The desired gradient is $$\frac{\delta E}{\delta \hat{\phi}}$$

but since statistical averaging is not practical, $$\frac{\delta e_n^2}{\delta \hat{\phi}},$$

its short term average, or another suitable function of $$\frac{\delta e_n^2}{\delta \hat{\phi}}$$

is used instead. The unbiased estimate of $$\frac{\delta E}{\delta \hat{\phi}}$$

used for the purpose of illustration is $$\frac{\delta e_n^2}{\delta \hat{\phi}} = 2e_n[c' r_n\sin\hat{\phi} - c' \check{r}_n\cos\hat{\phi}], \quad (4)$$

where equation (4) is simply produced by differentiating $e_n^2$ in equation (3). The expression of $c' r_n\sin\hat{\phi} - c' \check{r}_n\cos\hat{\phi}$ in equation (4) is the Hilbert transform of the output signal or replica synthesized by echo canceller 123. Thus, the adaptive updating equation for $\hat{\phi}$ is $$\hat{\phi}_{n+1} = \hat{\phi}_n + \beta_n e_n[c'_n \check{r}_n \cos\hat{\phi}_n - c'_n r_n \sin\hat{\phi}_n], \quad (5)$$

where the term in the brackets is generated by taking the Hilbert transform of the canceller output.

The foregoing discussion has focused on a static phase shift $\phi$, but time variation in $\phi$ may be tracked up to the limit of the algorithm. In other words, if the phase, $\phi$, is a rapidly varying function of time, then $\beta_n$ will have to become correspondingly large to allow for tracking. $\beta_n$ is the step size of the controlling algorithm which determines the maximum rate at which phase adjustments are made. However, there is an upper limit to $\beta$ consistent with having a stable algorithm. In the presence of frequency offset, the phase estimate $\hat{\phi}$ will be continuously adjusted so long as the signal $r_n$ is present. However, when $r_n$ goes to zero or a very small value such as when speech stops, phase tracking as given in equation (5) must stop even though the source of phase variation in the echo path continues. Thus, when speech resumes reconvergence would be necessary. The preferred method is to treat the phase variable of equation (5) instead as a phase increment $\Delta\hat{\phi}$, and to accumulate $\Delta\hat{\phi}$ to obtain $\hat{\phi}$ as shown in FIG. 1. For this configuration, when $r_n$ is zero, $\Delta\hat{\phi}$ is no longer adapted but $\hat{\phi}$ continues to vary and track according to the last estimate of frequency offset. This implementation also provides a means to disable the adaptive phase tracking loop during double talk while still maintaining an estimate of frequency offset.

The control signal processing portion of the adaptive adjustment loop of phase shifter 122 has two signal inputs. The first is the signal produced by the combined operation of phase shifter 122 and echo canceller 123. The other input is the residual echo provided by the output of signal combiner 129. The former is shifted in phase by 90° in Hilbert transformer 131 and multiplied by the latter input in multiplier 132. As previously mentioned, Hilbert transformers are well known to those in the art. These transformers may be implemented using digital or analog techniques. See, for example, "On the Behavior of Minimax FIR Digital Hilbert Transformers" by L. R. Rabiner and R. W. Shafter in *The Bell System Technical Journal*, Vol. 53, No. 2, Feb. 1974, pp 363–389 and "Normalized Design of 90° Phase-Difference Networks" by S. D. Bedrosian, *IRE Trans. on Circuit Theory*, Vol. CT-7, No. 2, June 1960, pp. 128–136. The output signal or product of multiplier 132 is applied to amplifier 133 whose gain is typically much less than unity.

The output of amplifier 133 is stored in a first accumulator comprising adder 134 and delay 136. A second accumulator receives the output of delay 136. The second accumulator similarly includes adder 137, delay element 138 and additionally optional amplifier 139. The first amplifier provides a gain factor which determines the speed of phase convergence and stability of a phase adaptive loop while the second amplifier has less than unity gain. The sole purpoe of amplifier 139 is to insure overall stability which may be desirable during certain operating conditions. The output signal of delay 138 is a digital signal indicative of the value of $\hat{\phi}$.

This signal is applied to trigonometric converters 141 and 142 designated respectively as $\sin\hat{\phi}$ and $\cos\hat{\phi}$. Each converter may be realized as a look-up table in accordance with their respective trigonometric function and may take the well known form of a read-only memory. Converters 141 and 142 produce values of the trigonometric functions in accordance with the phase indicative input signal. Multipliers 126 and 127 apply these values to the signal provided by converter 188 to produce a phase shift in the output of signal combiner 128. It should be pointed ojut that except for the accumulator of delay 138, which is added to provide more desirable performance, the arrangement of phase shifter 122 is a physical implementation of the mathematical operations indicated by equation (5).

The operation of phase shifter 122 so far has for the most part been described when the phase adaptive loop is closed. When signals emanate from circuit 111 and are applied to hybrid 117, carrier system 116 is in its primary role of completing a through signal path to circuit 113 for original transmission signals instead of echo signals. During these signaling conditions, the output of combiner 129 will be a high level signal and in the absence of inhibit detector 144 will cause deleterious effect upon the operation of phase shifter 122. More specifically, the phase adaptive loop will erroneously interpret the high level signal as an error and may diverge degrading performance rather than converge to yield optimum echo cancellation. However, inhibit detector 144 is connected to the input of carrier system 114 and the output of carrier system 116 to detect signals originating from circuit 111 In the presence or absence of signals from circuit 112 and opens switch 125. This prevents the phase conrol loop of phase shifter 122 from adapting. The two accumulators store the value of the phase shift. If amplifier 139 is employed in the feedback path of delay 138, switch 146 is necessary to bypass amplifier 139 so that the value in delay 138 does not diminish and, in turn, effect the phase angle imparted by phase shifter 122. On the other hand, if amplifier 139 is not used in the accumulator of delay 138, switch 146 is not necessary and the two accumulators of phase shifter 122 will have the same configuration.

Figure 2:
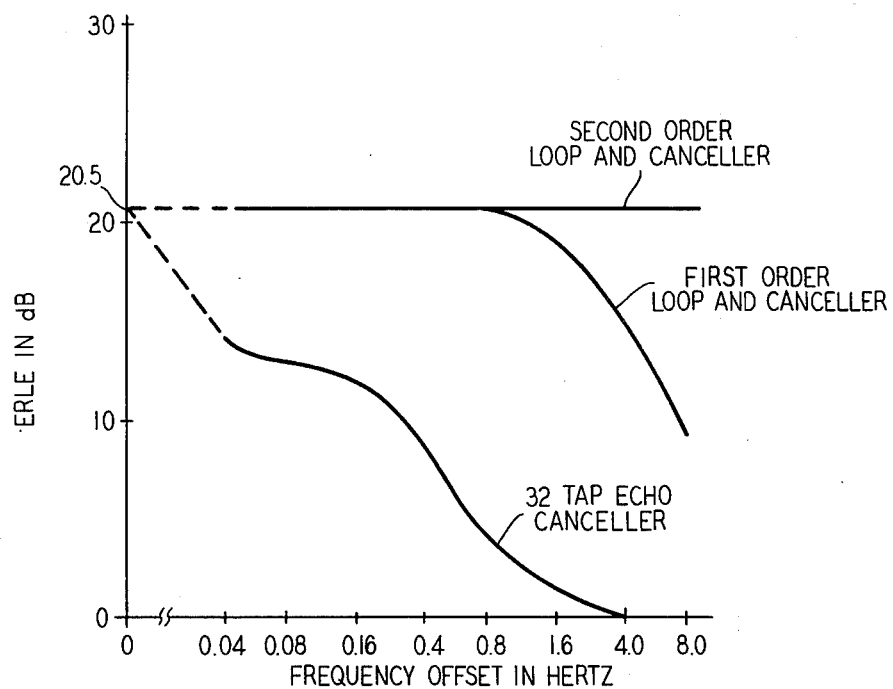
FIGS. 2 and 3 depict results of several tests conducted to indicate the performance which can be achieved using the principles of the present invention.
Figure 3:
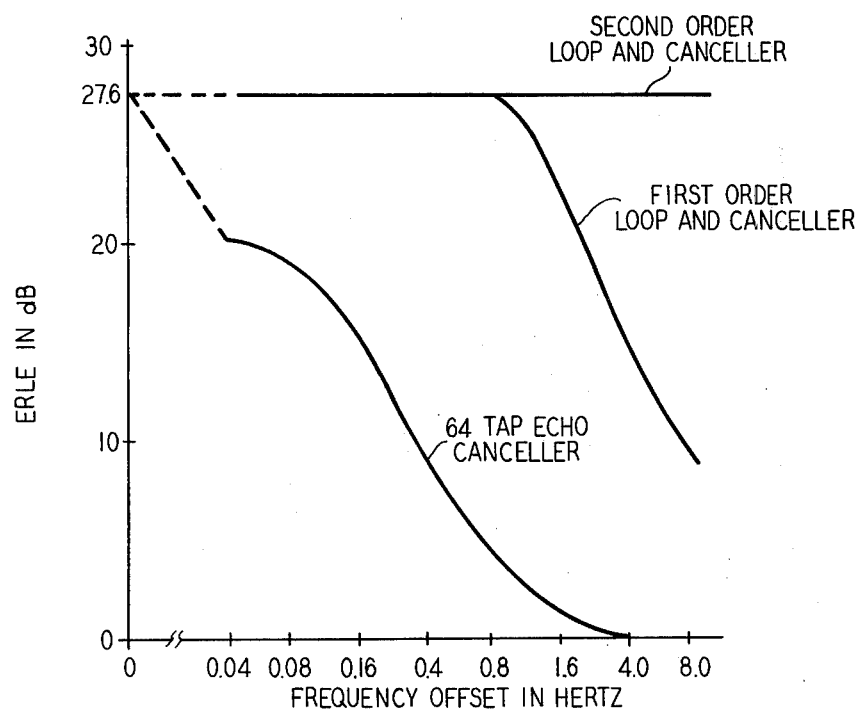

FIGS. 2 and 3 illustrate the results of several tests conducted to ascertain the beneficial performance provided by the present inventive concept. The echo path and echo cancelling apparatus in each case were simulated, but the transfer characteristic of the echo path was selected to represent a more severe case than most echo paths encountered in practice. More specifically, the impulse response of the simulated echo path was selected to have an impulse response of long duration. For each case, the echo return loss enhancement (ERLE) was plotted in decibels over a range of frequency offsets. A common step size was used in all the tests. For the message signal, a white noise signal with energy in the band from 0 Hz to 4000 Hz was used in the simulations. The echo path had a low-pass characteristic with a cutoff frequency of 3400 Hz. The sampling frequency of the digital signal was 8 kilohertz.

In FIG. 2, the results of the performance is shown for a transversal filter adaptive echo canceller with a delay line of 32 taps. The canceller was tested without the present variable phase shifter and with two different arrangements of the present variable phase shifter. One is with a first order phase adaptive loop, which does not include the second accumulator 138, 137, and the other is with a second order phase adaptive loop which provides superior performance. In FIG. 3, the performance of the same test combinations is shown wherein the echo canceller has a delay line with 64 taps.

As can be observed from FIGS. 2 and 3, the addition of a variable phase shifter increases the performance capability of various echo cancelling arrangements of different complexity. In fact, the variable phase shifter with the second order phase-adaptive loop enables the echo canceller to provide its optimum amount of echo cancellation throughout the range of offset frequencies utilized to generate the results shown in FIGS. 2 and 3.

Although the echo cancelling apparatus for providing the phase shift and replica of the echo signal has been illustrated by means of digital apparatus, it will be evident to those skilled in the art that equivalent analog circuit techniques may also be employed to advantage. Even in digital apparatus the arithmetic functions in the signal processing circuits may be time-shared to provide a further reduction in implementing apparatus, thereby exploiting the high-speed capability of digital aparatus such as, for example, digital multipliers. In other words, time-division multiplexing of digital multipliers between the signal processing of the variable phase shifter and the signal processing in the echo canceller will achieve further circuit economies. This is particularly true in view of the relatively slow word rate required for encoded speech compared to the high-speed capability of readily available integrated circuits. One or more of the illustrated echo cancelling arrangements, including the variable phase shifter and echo canceller, may also be time-division multiplexed to serve a plurality of transmission channels, and thus provide system economies. Furthermore, it is to be understood that the arrangements described in the foregoing are merely an illustrative application of the principles of the present invention. Numerous and varied other arrangements may be utilized by those skilled in the art without departing from the spirit and scope of the invention.

What is claimed is:

1. Echo cancelling apparatus comprising a variable phase shifter and an adaptive echo canceller connected in series and forming a shunt signal path across an echo path containing an echo signal which includes a time-varying phase shift, said shunt path producing an output signal formed by the serial signal processing of said phase shifter and said canceller, subtracting means for producing a residual echo as the difference between the output signal and the echo signal, said canceller responsive to the residual echo by changing the output signal to reduce the residual echo, and said phase shifter responsive to the residual echo and the output signal for producing a time-varying phase shift in the output signal corresponding to the time-varying phase shift of the cho signal to minimize the residual echo signal.

2. Echo cancelling apparatus comprising a variable phase shifter and an adaptive echo canceller connected in series to provide a shunt signal path between two one-way signal paths having one of said two paths containing an echo signal subjected to a time-varying phase shift, said canceller processing the original signal which produces the returned echo signal to provide a replica of the echo signal absent the time-varying phase shift as one component of the composite output signal of said shunt path for subtraction from the echo signal including the time-varying phase shift, said canceller responsive to the residual echo resulting from the subtraction for changing the replica to reduce the residual echo, and said variable phase shifter responsive to the residual echo signal and the output signal for producing a time-varying phase shift in the composite output signal so that the residual echo is minimized.

3. In echo cancellation apparatus which includes an adaptive echo canceller coupled across the echo path of a four-to-two wire junction wherein the echo path introduces a time-varying phase shift component on the echo signal, said cancellation apparatus being characterized by variable phase shifting means connected serially in circuit with said echo canceller for synthesizing an output signal which is a composite duplicate of the echo signal including the time-varying phase shift signal component by the serial signal processing of said echo canceller and said variable phase shifting means, means for producing a residual echo by subtracting the output signal from the echo signal, said canceller being responsive to the residual echo by modifying the output signal to reduce the residual echo, and said variable phase shifting means including controlling means responsive to the output signal and the residual echo for adapting the phase of said variable phase shifting means to impart a time-varying phase shift to the output signal corresponding to the phase shift component of the echo signal to minimize the residual echo.

4. Echo cancelling apparatus in accordance with claim 3 wherein said phase shifting means comprises input means for dividing the signal into two signal components having a quadrature phase relationship, means for multiplying one of the two signal components by one of a first set of predetermined factors selected in accordance with said controlling means to produce an output, means for multiplying the other of the two signal components by one of a second set of predetermined factors selected in accordance with said controlling means to produce an output, and means for combining both of the outputs together to produce a phase shifted output signal.

5. Echo cancelling apparatus in accordance with claim 4 wherein said controlling means includes multiplying means having two inputs, one of which receives the residual echo, means for transforming the replica by a quadrature phase shift for application to the other input of said multiplying means so that same produces a signal indicative of the time-varying phase shift on the echo signal.

6. Echo cancelling apparatus in accordance with claim 5 wherein said controlling means includes accumulating means for storing the signal indicative of the time-varying phase shift on the echo signal and produces an output indicative of the change of the phase shift.

7. Echo cancelling apparatus in accordance with claim 6 wherein said controlling means further includes a second accumulating means for storing the output indicative of the change of the phase shift and produces an output indicative of the frequency of the change in phase shift for application to both of the means for multiplying.

8. Echo cancelling apparatus in accordance with claim 7 wherein the first set of predetermined factors of said means for multiplying corresponds to the value of the sine of the time-varying phase shift and the second set of predetermined factors of the other of said means for multiplying corresponds to the value of the cosine of the time-varying phase shift on the echo signal.

9. Echo cancelling apparatus in accordance with claim 8 further comprising detecting means responsive to transmission signals propagating from the two-wire side to the four-wire side of said junction and switching means controlled by said detecting means when said transmission signal is present for preventing the response of said canceller to the residual echo and preserving the stored content of said second accumulating means so that said phase shifting means maintains a constant phase roll.

* * * * *